March 10, 1970     J. M. JESSEE     3,500,380
BINARY INPUT TORQUE MOTOR
Filed Oct. 22, 1965
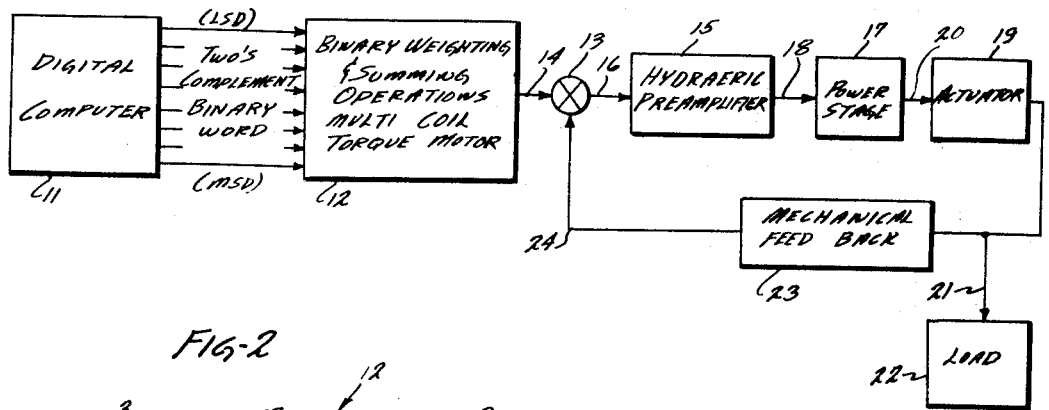
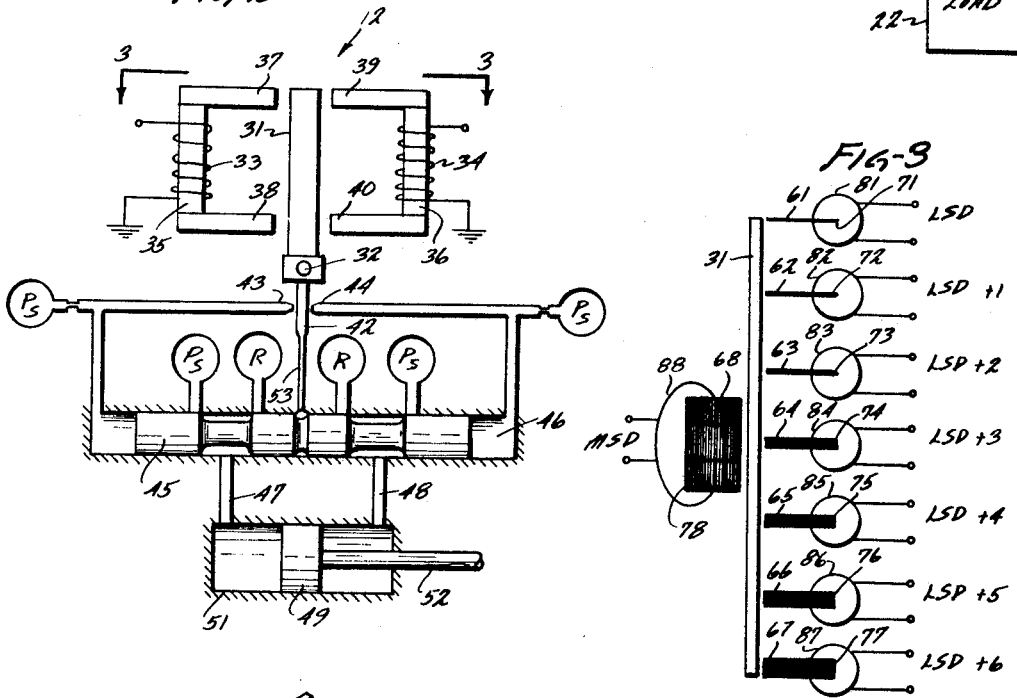
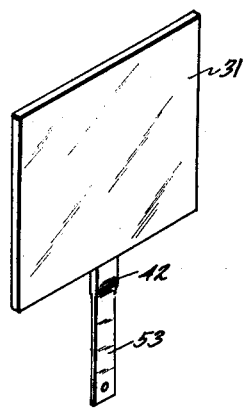
INVENTOR
JAMES M. JESSEE
BY Wilson, Robbins & Anderson
ATTORNEYS

United States Patent Office 3,500,380
Patented Mar. 10, 1970

3,500,380
BINARY INPUT TORQUE MOTOR
James M. Jessee, Granada Hills, Calif., assignor to Bell Aerospace Corporation, a corporation of Delaware
Filed Oct. 22, 1965, Ser. No. 501,092
Int. Cl. H03k 13/00; H04l 3/00
U.S. Cl. 340—347      5 Claims

ABSTRACT OF THE DISCLOSURE

A servo valve having a torque motor capable of receiving parallel binary electrical input signals from a source thereof such as a digital computer and converting the same to an analog mechanical position which in turn is capable of positioning an actuator connected to a load. The torque motor includes a magnetically sensitive armature and a plurality of magnetically saturable pole pieces each positioned adjacent the armature thereby to apply a predetermined fixed force to the armature when the pole piece is magnetically saturated.

---

This invention relates generally to hydraerically-powered servo control systems and, more particularly, to torque motors utilized for application of electrical input signals to such systems. More specifically, the present invention relates to a torque motor capable of receiving a parallel binary electrical input signal and converting the same to an analog mechanical position. The term "hydraeric" as used throughout this specification and claims is intended to be generic to liquids and gasses and to include both hydraulics and pneumatics.

Many systems utilizing hydraeric servo control mechanisms as a part thereof utilize electrical command or feedback signals. Such electrical signals may be developed in a large number of ways, and, for example, many such command signals are developed as an output of a computer. Such output signals may take any form desired but in many control systems presently in existence the output signal is in digital forms and is very often based upon a twos-complement concept of digital information. It is also quite often the case that such binary digital signals are formed in such a way that the components of the binary word, that is, the bits, which make up the binary word, are in parallel form; that is, all of the bits are presented by the digital computer as an output signal simultaneously for each binary word. Such a binary signal must be converted to a useful form within the servo control system and, preferably, this is accomplished in the torque motor of the servo control system.

As is well known in the prior art, in order for any system utilizing a hydraeric servo control mechanism to operate properly, extremely high reliability is required. The output signals from the digital computer may vary insofar as the amplitude thereof is concerned unless precautions are taken to provide a precision output signal. When such precision output signals are provided, very obviously the cost of the system including the computer is increased. It is therefore desirable, from an expense point of view, to provide signals without real concern for the noise level, amplitude, or any interference that may be included therewith. The only real concern is to always have either a completely on or a completely off state for each of the bits appearing in each binary word. In all known prior art devices, such a non-precision electrical signal from the digital computer would introduce unwanted error signals in the servo control mechanism, and thus in the overall system, and would thereby affect the performance and the reliability of the overall system.

Accordingly, it is an object of the present invention to provide a torque motor for converting parallel binary electrical signals into a useful analog mechanical position which torque motor is insensitive to variations in the amplitude of input signals above a predetermined level.

It is another object of the present invention to provide a torque motor for converting parallel binary electrical signals into a useful analog mechanical position, in which torque motor the binary weighting and summing are accomplished in the torque motor assembly to provide a mechanical output position which is representative of the electrical input parallel binary signal.

It is a further object of the present invention to provide a torque motor for converting parallel binary electrical signals into a useful analog mechanical position which does not require a precision output signal from the digital computer providing the parallel binary signal, which is relatively inexpensive compared to prior art devices, and which is quite rugged even under adverse operating conditions.

A torque motor adapted for receiving parallel binary signals and converting the same to an analog mechanical position includes an armature means having a magnetically sensitive portion and a parallel-binary signal receiving means, including a plurality of magnetically saturable pole pieces, each positioned adjacent the armature means. Each of the saturable pole pieces is adapted to be magnetically saturated in response to the application of a predetermined bit, when in the on condition, of said binary word to said torque motor.

Other more specific objects and advantages of the present invention will become apparent from a consideration of the following description taken in conjunction with the accompanying drawing which is presented by way of example only and is not intended as a limitation upon the scope of the present invention as defined by the claims appended hereto and in which:

FIG. 1 is a schematic diagram in block form of a system employing a parallel binary input torque motor in accordance with the present invention;

FIG. 2 is a schematic diagram of a hydraerically powered servo actuator within which a torque motor in accordance with the present invention may be utilized;

FIG. 3 is a top elevational view of a portion of the mechanism shown schematically in FIG. 2 taken about the line 3—3 thereof;

FIG. 4 is a perspective view of the armature means utilized in the servo actuator as schematically illustrated in FIGS. 2 and 3.

Referring now to the drawing and, more particularly to FIG. 1 thereof, there is illustrated by way of a schematic diagram in block form a system employing a parallel binary input torque motor in accordance with the present invention. As is shown therein, a digital computer 11 generates a binary word having a plurality of bits arranged in parallel form. Such bits appear in the twos complement configuration and range from the least significant digit (LSD) up through and including the most significant (MSD). As is shown in FIG. 1, the twos complement binary word therein illustrated has eight bits making up the word. As is well known in the digital computer art, each of the bits is adapted to have an "on" state and an "off" state. If an electrical signal appears at a position designated for a particular bit, then the bit is on and as is often indicated, a binary 1 is designated. If, on the other hand, no electrical signal appears, then the bit is in the "off" state or a binary 0 is indicated. It of course should be understood that the "on" state may be selected as the binary 1 and "off" state as a binary 0 if such is desired.

As is also shown in FIG. 1 the parallel binary twos complement word is applied to a torque motor 12 arranged in accordance with the present invention to receive a parallel binary word. The torque motor of the present invention is a multi-coil apparatus adapted to accomplish the weighting and summing operations required with a binary signal. The torque motor 12 accomplishes such weighting and summing operations and converts the binary signal to an analog mechanical torque which is then applied to a summing point 13 by way of a connection indicated by the arrow 14. The output of the summing point 13 is connected to a hydraeric pre-amplifier 15 as is indicated by the connecting arrow 16. The output of the pre-amplifier is applied then to a power stage 17 as indicated by the connecting arrow 18, the output of which is utilized to position an actuator 19, as is indicated by the connecting arrow 20. Positioning of the actuator 19 causes a load 22 connected to the actuator as indicated by the connecting arrow 21 to assume a predetermined and desired position in accordance with the signal applied from the digital computer 11 in the first instance. In many instances, to accomplish the desired stability for the system, a portion of the output signal from the actuator is applied by way of a mechanical feedback 23 through a connecting medium as shown by the arrow 24, to the summing point 13. Such mechanical feedback is old and well-known in the prior art such, for example, as shown in U.S. Patent No. 3,225,346 and will not be discussed further.

Referring now more particularly to FIG. 2, a servo valve employing various features of the overall system as indicated in FIG. 1 is shown in schematic form. As is therein illustrated, the torque motor 12 includes armature means 31 positioned and adapted to pivot about a pivot point 32 in response to the application of electrical signals in binary form to a binary word signal receiving means such as that shown by the coils 33 and 34 positioned upon cores 35 and 36 respectively. Positioned adjacent the armature means are pole pieces 37 and 38 associated with the core 35 and pole pieces 39 and 40 associated with the core 36. The pole pieces are adapted to be magnetically saturated in response to the application of a binary bit to the coils 33 and 34. Upon the application of such binary bits to the coils 33 and 34, a force is exerted upon the armature means 31, which includes as a part thereof a magnetically sensitive portion, in such a manner that the armature pivots about its pivot point 32 thus causing a flapper 42 to move with respect to the nozzles 43 and 44.

Such movement of the flapper 42 creates a differential pressure across a spool valve 45 as is well known in the prior art. Such differential pressure causes the spool valve to move within the chamber 46 to open flow ports which cause a source of hydraeric fluid under pressure to flow through the conduits 47 and 48 connected to opposite sides of a piston 49 positioned within a chamber 51 and having an actuator rod 52 connected thereto. The actuator rod 52 is in turn connected to a desired load for positioning the same in response to the signals applied to the torque motor 12. A feedback spring 53 is interconnected between spool valve 45 and flapper 42 to provide negative feedback to stabilize the operation of the system.

The construction and operation of a servo valve of the types schematically illustrated in FIG. 2 and above briefly described is well known in the prior art, such, for example, as is illustrated in U.S. Patent 2,947,286 and will not be further described herein.

Referring now more particularly to FIGS. 3 and 4, a torque motor adapted for receiving a parallel binary input signal having a plurality of bits making up the binary word and constructed in accordance with the present invention is illustrated more in detail. As is therein shown, the armature means 31 is magnetically sensitive and may, for example, be constructed as a relatively flat plate member as is illustrated in FIG. 4. Depending from the plate member and attached thereto is the flapper 42 and the feedback spring 53. Positioned adjacent the armature means 31, as illustrated in FIG. 3, is a binary word signal receiving means designated LSD, LSD+1 through LSD+6, and MSD. Each of the LSD and the MSD designations is indicative of a binary bit which makes up a part of a parallel binary word which may be applied to the terminals associated with each of the LSD and the MSD designations illustrated in FIG. 3.

The binary word signal receiving means includes a plurality of magnetically saturable pole pieces 61 through 68. Each of the pole pieces is associated with a core 71 through 78 upon which there is wound a coil 81 through 88 to which the terminals above referred to are connected so that a signal may be applied thereto.

It should be noted that the area of each of the pole pieces 61 through 68 is directly proportional to a significance of the binary bit in the parallel binary word electrical input signal which is applied to the signal receiving means; i.e., the least significant digit pole piece 61 has the least overall area positioned adjacent the armature means 31. The LSD+1 pole piece has a larger area than the LSD pole piece. Each of the successive pole pieces increases in area accordingly until the most significant digit pole piece is arrived at. It should be noted that the most significant pole piece 68 has an area which is greater than the total area of the remainder of the pole pieces, by an amount equal to the area of the least significant pole piece 61. It should also be noted that the most significant digit pole piece 68 is positioned on the opposite side of the armature means 31 from the remainder of the pole pieces. In this manner, the twos complement of the binary bits can be generated. The most significant digit pole piece, therefore, is energized only during the period of time when a negative signal is being applied to the torque motor 12.

The particular relationship of each of the pole piece areas with respect to the remainder is indicated in Table 1 set forth herein below.

TABLE 1

| Area of pole piece | Polarity of coil | Value of binary digit represented by energized coil |
|---|---|---|
| A | + | $2^0=1$ (LSD) |
| 2A | + | $2^1=2$ (LSD+1) |
| 4A | + | $2^2=4$ (LSD+2) |
| 8A | + | $2^3=8$ (LSD+3) |
| 16A | + | $2^4=16$ (LSD+4) |
| 32A | + | $2^5=32$ (LSD+5) |
| 64A | + | $2^6=64$ (LSD+6) |
| 128A | − | $-2^7=-128$ (MSD) |

It is by this differentiation between the areas of pole pieces that the binary weighting is accomplished in a torque motor in accordance with the present invention.

The twos complement mode parallel binary code is represented in Table 2 which is set forth herein below.

TABLE 2.—PARALLEL BINARY CODE: TWO'S COMPLEMENT MODE

| Binary word value | Two's complement binary word | Word value calculation (MSD)          (LSD) |
|---|---|---|
| 8  | 0 1 0 0 0 | 0+8+0+0+0=  8 |
| 7  | 0 0 1 1 1 | 0+0+4+2+1=  7 |
| 6  | 0 0 1 1 0 | 0+0+4+2+0=  6 |
| 5  | 0 0 1 0 1 | 0+0+4+0+1=  5 |
| 4  | 0 0 1 0 0 | 0+0+4+0+0=  4 |
| 3  | 0 0 0 1 1 | 0+0+0+2+1=  3 |
| 2  | 0 0 0 1 0 | 0+0+0+2+0=  2 |
| 1  | 0 0 0 0 1 | 0+0+0+0+1=  1 |
| 0  | 0 0 0 0 0 | 0+0+0+0+0=  0 |
| −1 | 1 1 1 1 1 | −16+8+4+2+1=−1 |
| −2 | 1 1 1 1 0 | −16+8+4+2+0=−2 |
| −3 | 1 1 1 0 1 | −16+8+4+0+1=−3 |
| −4 | 1 1 1 0 0 | −16+8+4+0+0=−4 |
| −5 | 1 1 0 1 1 | −16+8+0+2+1=−5 |
| −6 | 1 1 0 1 0 | −16+8+0+2+0=−6 |
| −7 | 1 1 0 0 1 | −16+8+0+0+1=−7 |
| −8 | 1 1 0 0 0 | −16+8+0+0+0=−8 |

As can readily be seen, Table 2 is arranged for a binary word having 5 bits. The table is obviously expandable to a situation wherein the binary word has 8 bits therein as is the case with respect to the torque motor illustrated in FIGS. 3 and 4 above referred to and described.

Irrespective of the number of digits or bits contained within the binary word which is applied in parallel fashion to the torque motor in accordance with the present invention, it should be expressly understood that the pole pieces adjacent the magnetically sensitive armature 31 are driven to magnetic saturation when the particular bit signal applied to the coils 81 through 88 is in its "on" state; that is, the presence of an electrical signal upon the terminals connected to the coils 81 through 88 drives the pole piece 61 through 68 respectively associated therewith to magnetic saturation. The number of turns present within each of the coils 81 through 88 and the area of the pole pieces 61 through 68 are chosen in such a manner that the smallest level of signal supplied by the computer always drives the pole piece to magnetic saturation. Thereafter, any variation in the signal which may be caused by non-precision computer components, noise present upon the line, or other such interference components will have no affect upon the force exerted upon the magnetically sensitive armature means 31.

There has thus been disclosed in some detail an embodiment of a parallel binary torque motor capable of receiving a binary word value from a digital computer having a plurality of bits arranged in parallel form which is insensitive to signal variation above a predetermined level. Although the embodiment of the present invention has been illustrated and described in some detail, such description and illustration is by way of example only and is not to be taken as a limitation upon the scope of the present invention as defined by the appended claims.

What is claimed is:

1. A torque motor adapted for receiving, as an electrical signal, a binary word having a plurality of bits arranged in parallel form, each of said bits having an on state and an off state, said torque motor comprising:
    (a) magnetically sensitive armature means; and
    (b) binary word signal receiving means including
        (1) a plurality of magnetically saturable pole pieces positioned adjacent said armature, that portion of each of said pole pieces adjacent said armature having a different area which is proportional to the significance of the bit signal applied thereto as it appears in said binary word, each pole piece thereby being adapted, when energized, to exert a predetermined fixed force on said armature, and
        (2) means for magnetically saturating each of said pole pieces in response to application of a binary word bit to said signal receiving means when said bit is in the "on" state.

2. A parallel-binary input torque motor as defined in claim 1 in which said magnetically sensitive portion of said armature includes a plate-like member and said pole pieces are spaced along said plate-like member.

3. A parallel-binary input torque motor as defined in claim 1 in which said plurality of pole pieces includes a first pole piece representative of the most significant digit in said binary word and the remainder of said pole pieces are representative of lesser signficant digits, said most significant digit pole piece when energized exerting a force on said armature in one direction and said remainder of said pole pieces, when energized exerting a force on said armature in the opposite direction.

4. A parallel-binary input torque motor as defined in claim 3 where the area of said first pole piece adjacent said armature is greater than the sum of the total areas of said remainder of said pole pieces adjacent said armature by an amount equal to the area of said pole piece representative of the least significant digit of said binary word.

5. A torque motor adapted for receiving as an electrical signal, a binary word having a plurality of bits arranged in parallel form, each of said bits having an on state and an off state, said torque motor comprising:
    (a) an armature assembly pivotally mounted on the frame of said motor and including a magnetically sensitive portion;
    (b) a plurality of magnetic cores each having a magnetically saturable pole piece, each positioned adjacent said armature assembly in cooperative relationship with said magnetically sensitive portion thereof to provide a magnetic circuit, and that portion of each of said cores adjacent said armature having a different area, said area being proportional to the significance of the bit signal applied thereto as said bit signal appears in said binary word;
    (c) a coil wound upon each of said cores; and
    (d) means connected to each of said coils for applying an electrical signal thereto,
        (1) said electrical signal applied to each of said coils being a bit in said binary word and when in the on state thereof being of sufficient magnitude to magnetically saturate the pole piece associated therewith thereby to apply a predetermined fixed force to said armature,
        (2) the force exerted upon said armature by application of said bit signal to each coil being proportional to the significance of the respective bit applied to each coil as it appears in the binary word applied to said torque motor.

References Cited

UNITED STATES PATENTS

| | | | |
|---|---|---|---|
| 2,947,286 | 8/1960 | Baltus et al. | 91—365 |
| 3,007,086 | 10/1961 | Baumeister | 335—266 |
| 3,206,160 | 9/1965 | Bennett | 335—266 |
| 3,219,854 | 11/1965 | McLaughlin | 335—267 |
| 3,071,714 | 1/1963 | Hadekel | 335—227 |
| 3,225,346 | 12/1965 | Buddenhagen | 340—347 |
| 3,238,522 | 3/1966 | Cameron | 340—347 |

FOREIGN PATENTS 1,162,483  2/1964  Germany.

MAYNARD R. WILBUR, Primary Examiner

J. GLASSMAN, Assistant Examiner

U.S. Cl. X.R.

251—129